Oct. 29, 1935.  A. K. JOHNSON  2,018,788
HEADLIGHT
Filed June 18, 1934  2 Sheets-Sheet 1
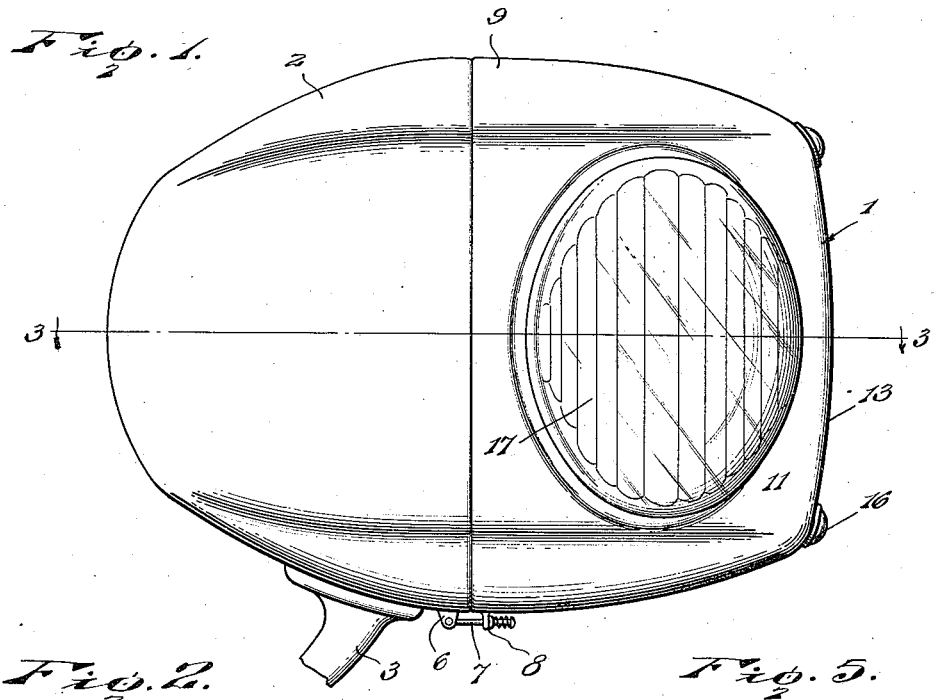
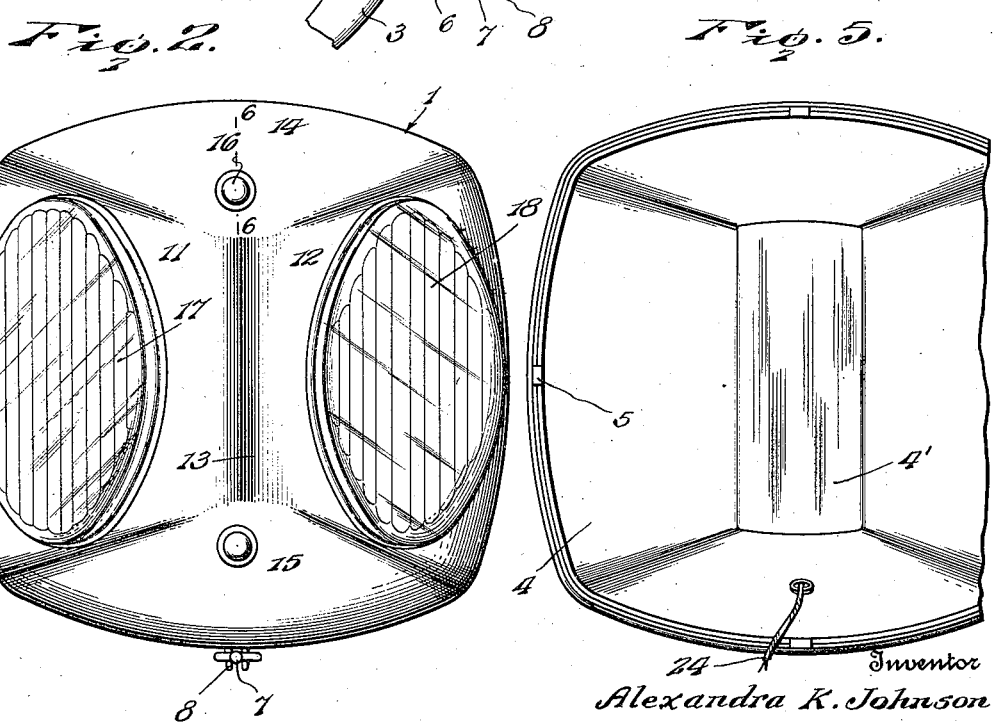

Oct. 29, 1935. A. K. JOHNSON 2,018,788
HEADLIGHT
Filed June 18, 1934  2 Sheets-Sheet 2
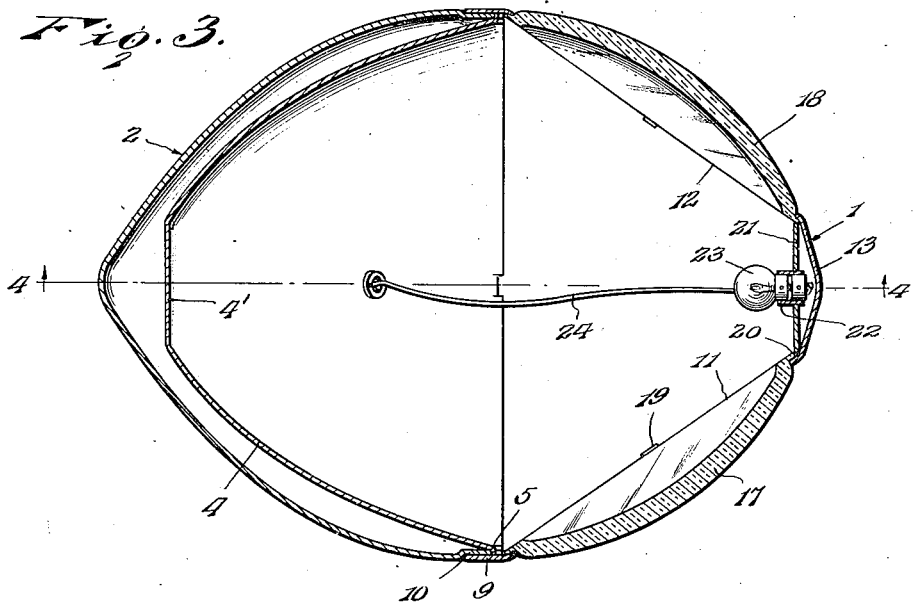
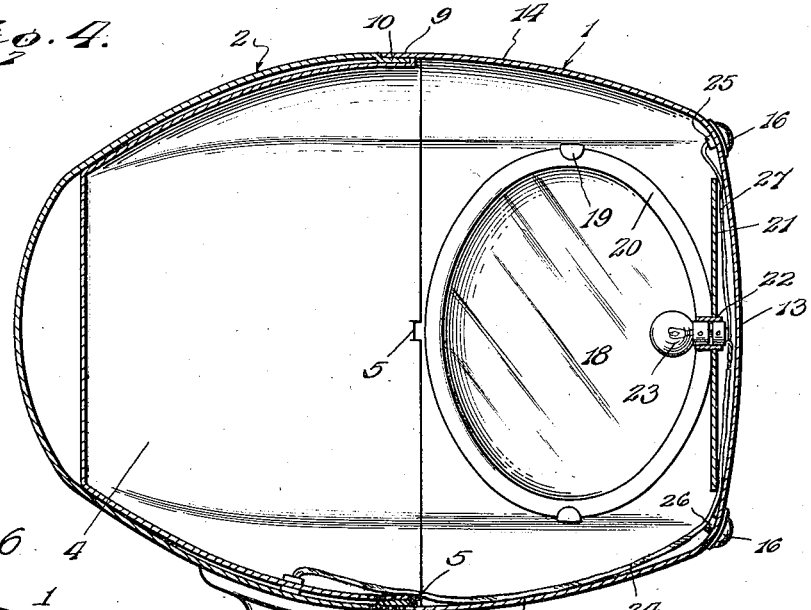
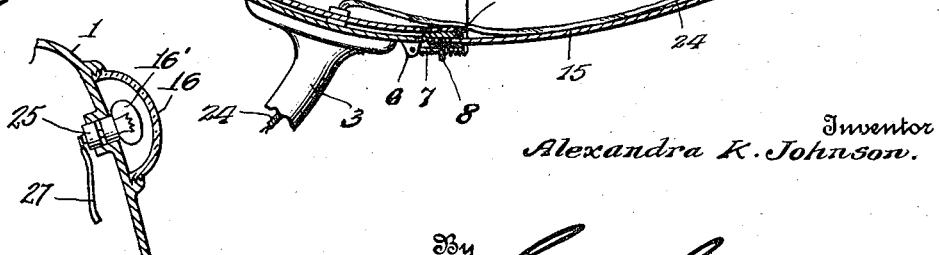
Inventor
Alexandra K. Johnson.
By Lacey & Lacey, Attorneys Patented Oct. 29, 1935

2,018,788

UNITED STATES PATENT OFFICE 2,018,788

HEADLIGHT

Alexandra K. Johnson, Plattsburg, N. Y.

Application June 18, 1934, Serial No. 731,175

7 Claims. (Cl. 240—41.1)

This invention relates to an improved headlight which is more particularly adapted for use with motor vehicles.

The invention seeks, among other objects, to provide a device of this character which is of such construction that reflected rays will be projected forwardly and to the sides of the vehicle without glare and blinding the eyes of approaching motorists or pedestrians.

Another object of the invention is to provide a headlight embodying relatively small lenses disposed between the main lenses employed which will serve as a parking light.

A further object of the invention is to provide a headlight which may be readily taken apart so that access to the interior thereof, for effecting the changing of bulbs or the like, may be had with relative ease.

And a further object of the invention is to provide a headlight which, in addition to high efficiency in use, will be attractive in appearance and inexpensive to manufacture.

Other and incidental objects of the invention not specifically mentioned in the foregoing, will be apparent as the description of the invention proceeds.

My invention is illustrated in the accompanying drawings, wherein:

Figure 1 is a side elevation of my headlight assembled.

Figure 2 is a front view of the device.

Figure 3 is a horizontal longitudinal sectional view on the line 3—3 of Figure 1, and looking in the direction of the arrows.

Figure 4 is a longitudinal vertical sectional view on the line 4—4 of Figure 3, and looking in the direction indicated by the arrows.

Figure 5 is a fragmentary plan view showing the rear portion of the headlight.

Figure 6 is a fragmentary sectional view taken along the line 6—6 of Figure 2.

Referring now more particularly to the drawings, wherein like numerals of reference designate like parts, the numerals 1 and 2 designate the forward and rear shell sections respectively of my improved headlight. By referring to Figure 3 of the drawings, it will be seen that the rear section is substantially bullet-shaped or semi-elliptical in horizontal section. The rear section is adapted to be secured to a fender or other supporting device by means of a bracket, a portion of which is shown at 3. It should be understood, of course, that any suitable type of bracket may be employed for securing the headlight in proper operative position. Mounted in the rear shell section 2 and spaced substantially uniformly therefrom throughout its length, is a reflector 4 which is substantially semi-elliptical in shape and is provided with a flat rear wall 4'. The reflector is provided at its larger end with outwardly struck ears or tabs 5 which, as better seen in Figure 4 of the drawings, are adapted to be clamped between the meeting rims of the shell sections for supporting the reflector in position. Formed on the bottom of the shell section 2, forwardly of the bracket 3 and near the edge of said shell section, is a yoke 6 having a spring latch 7 swingingly connected thereto. The latch 7 is adapted to be engaged behind ears 8 which are formed on the forward shell section 1. The latch serves effectually to connect the two sections and also provides means for retaining the sections in proper relative position.

The forward shell section 1, which is associated with the rear section 2, is provided with a circular flange 9 which is adapted to overlie an offset circular flange 10 formed on the shell section 2. As best seen in Figures 2 and 3 of the drawings, the forward shell section 1 is substantially semi-elliptical in horizontal cross section for defining tapered meeting walls 11 and 12 which define a blunt front edge or nose 13. As will be seen in Figure 2 of the drawings, the walls are gradually reduced in height toward their corresponding forward ends so that top and bottom walls 14 and 15, which slope toward the nose 13, will be defined. Mounted in the top and bottom walls 14 and 15 in alinement with the nose 13, are relatively small lenses 16 which are preferably formed of a colored translucent material. The lenses 16 provide means whereby the lights of an oncoming vehicle will be reflected forwardly so that the driver of said oncoming vehicle may locate the exact position of the car. Danger of accidents, due to poor gauging of distance, will thus largely be eliminated.

Carried in the side walls 11 and 12 and extending throughout the major portion of the length and height of said walls are concavo convex circular lenses 17 and 18 which are relatively large and are disposed at substantially a forty-five degree angle with respect to each other. The lenses are held in place by means of ears 19, better seen in Figure 4 of the drawings, which are bent down over the inner edges of the rims of the lenses, which rims are indicated at 20 and are located behind the margins defining the circular openings which carry said lenses.

Disposed at the rear of the nose 13 and extending throughout the width thereof is a mounting plate 21 which is welded or otherwise secured to the inner face of the nose. Carried on the mounting plate 21 intermediate its height and width is a socket 22 which is adapted to carry a bulb 23 of any desired candle power. The bulb 23 is electrically connected to the lighting circuit of the vehicle by means of a cable 24 which extends downwardly behind the mounting plate 21 along the floor of the wall 15 and through the bracket 3. Sockets 25 and 26 are located behind the lenses 16, a cable 27 leading from the socket 22 upwardly to the socket 25 and connection to the socket 26 being made by tapping the cable 24. Bulbs 16' of relatively small candle power are placed in the sockets 25 and 26 and these bulbs can be utilized for parking lights when the vehicle is not in motion. It should be understood, of course, that the cable 24 carries a number of wires so that suitable separate connections to the socket 22 and to the sockets 25 and 26 may be made so that they may be controlled independently.

It will be understood that, in operation, when the bulb 23 is switched on, rays therefrom will project rearwardly and will be reflected by the reflector 4. The rays will be cast through the lenses 17 and 18, from said reflector, and will be projected in all directions except directly forward. It will be seen, therefore, that the roadway will be illuminated effectually at both the side and the front. Inasmuch as two headlights are usually employed on a motor vehicle, when the bulbs 23 thereof are switched on, the rays through each of the oppositely presented lenses will converge and intersect directly in front of the vehicle as well as a considerable distance forwardly thereof. As the rays of one of the headlights will intersect and project past the rays from the other headlight, no blind spots will be present and complete illumination of both sides of the roadway about the front of the vehicle as well as considerably forwardly thereof will be effected. The rear wall 4' of the reflector serves effectually to project rays as nearly forwardly as is possible, the nose 13 preventing direct forward projection of said rays from said wall 4'.

By referring to Figure 1 of the drawings, it will be seen that the device is streamline in contour so that it will effectually adapt itself for use with vehicles of modern design. Attention is directed to the fact that inasmuch as the lenses are not presented forwardly there will be no glare so that blinding of an approaching motorist or pedestrian will be prevented. Moreover, thorough illumination of the roadway forwardly as well as to the sides of the vehicle will be effected so that no blind spots will take place when the vehicle is rounding a curve or turning a corner.

The invention, as will be observed from a reading of the foregoing description, is of relatively simple construction and may be manufactured inexpensively. It should also be understood that variations may be made within the scope of the claims hereinafter appended. Although I have shown the angle of the walls to be substantially forty-five degrees, the angle thereof may be any one from forty-five to ninety degrees. Further, the invention is readily adapted for use on all makes of vehicles so that the device may be either furnished as standard equipment with new cars or may be installed on vehicles already in use.

Having thus described the invention, what I claim is:

1. A headlight including a casing having front and rear shell sections, a reflector carried in the rear section, said reflector having rearwardly converging walls and a flat vertically extending rear wall, lenses carried in the front section and extending diagonally with respect to each other and to said reflector and spaced from each other transversely of the casing at the front end of the front section, and a light source carried in the front end of the front section between the lenses opposite the flat rear wall of the reflector, said reflector being adapted for projecting light beams through the lenses whereby illumination of an area to the side and front of the headlight will be effected.

2. A headlight including front and rear shell sections, a reflector carried in the rear sections, lenses carried in the front shell section, the said front section having a vertically disposed nose between the lenses, a mounting plate carried by said nose within the front section, a socket carried on the mounting plate, a bulb carried in the socket, and means electrically connecting the bulb with the lighting system of a vehicle, said reflector projecting beams from the bulb through the lenses whereby illumination of an area to the side and front of the vehicle will be effected.

3. A headlight including companion circular shell sections having mating flanges, a reflector carried in one of said sections and having an ear adapted to be clamped by the mating flanges, lenses carried by the other of said sections, said other section being provided with a vertically disposed nose, a mounting plate carried on the nose within the section, a socket carried on the mounting plate, a bulb carried in the socket, and means connecting the bulb with a lighting system, said reflector being adapted to project rays from the bulb through the lenses whereby illumination of an area forwardly and to the side of the vehicle without glare will be effected.

4. A headlight including companion shell sections, a reflector carried in one of said sections, the other of said sections being provided with converging walls, concavo convex lenses carried in the converging walls of the second mentioned section, said section being provided with a nose at its forward portion, a mounting plate carried by the nose within the section, a socket carried by the mounting plate, a bulb in the socket, and means electrically connecting the socket with a lighting system, said bulb being adapted to project rays to the reflector and said reflector projecting the rays through the concavo convex lenses and substantially forwardly of the headlight whereby an area to the side and substantially to the front of the vehicle will be illuminated.

5. A headlight including companion shell sections, a reflector carried on one of said sections, the other of said sections having converging walls defining a nose, lenses carried by the second mentioned section on said walls, a mounting plate carried by the nose within the section, a socket carried thereby, a bulb normally carried in the socket, a conductor electrically connecting the bulb with the lighting system of a vehicle, a bracket for mounting the headlight on the vehicle, and a relatively small lens carried by the second mentioned section above the nose and being adapted for projecting a beam forwardly of the vehicle, said reflector projecting beams from the bulb through the lenses to the side and substantially to the front of the vehicle.

6. A headlight including mating shell sections, a reflector mounted in one of said sections in spaced relation thereto throughout the major portion of its length and being clamped at the junction of said sections, lenses carried by the second mentioned shell section, said section having a nose which is disposed between the lenses, a mounting plate carried by the nose within said section, a lighting source carried by the mounting plate, a bracket for mounting the headlight on a vehicle, and spaced alined lenses carried by the second mentioned section above and below the nose for projecting beams forwardly of the headlight.

7. A headlight including companion shell sections, a reflector carried in one of said sections, the other of said sections being provided with converging walls and curved top and bottom walls defining a nose, a circular concavo convex lens carried in each wall, ears carried by the walls and adapted to engage said lenses for retaining the lenses in mounted position, a mounting plate carried by the nose within the second mentioned section, a socket carried by the mounting plate, relatively small lenses carried at the junction of the top and bottom walls with the nose, sockets above and below the nose behind said lenses, a bulb in the first mentioned socket, bulbs in the second-mentioned sockets and conductors connecting all of the sockets with the lighting system of a vehicle, said sockets being independently connectable to said lighting system, said first mentioned bulb being adapted to project light beams to the reflector and said reflector reflecting the beams through the concavo convex lenses to the side and substantially forwardly of the headlight for illumination, said small lenses being adapted to project beams directly forwardly of the headlight.

ALEXANDRA K. JOHNSON.